June 13, 1939.                C. CONE                2,162,378
                         GLASS ANNEALING LEHR
                      Filed Jan. 28, 1935        4 Sheets-Sheet 1
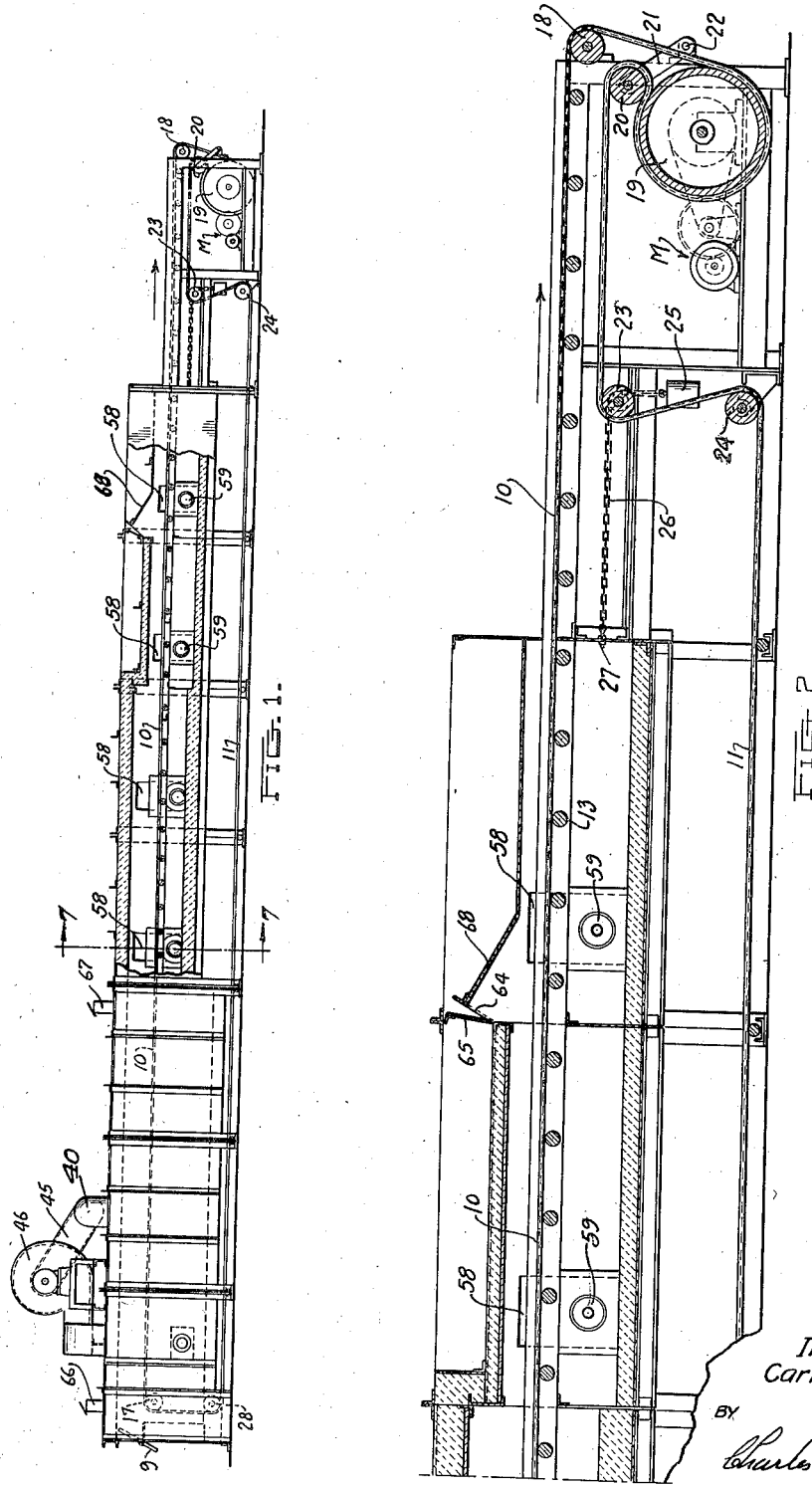
INVENTOR
Carroll Cone
BY
ATTORNEY June 13, 1939.                C. CONE                2,162,378
                        GLASS ANNEALING LEHR
                        Filed Jan. 28, 1935           4 Sheets-Sheet 2
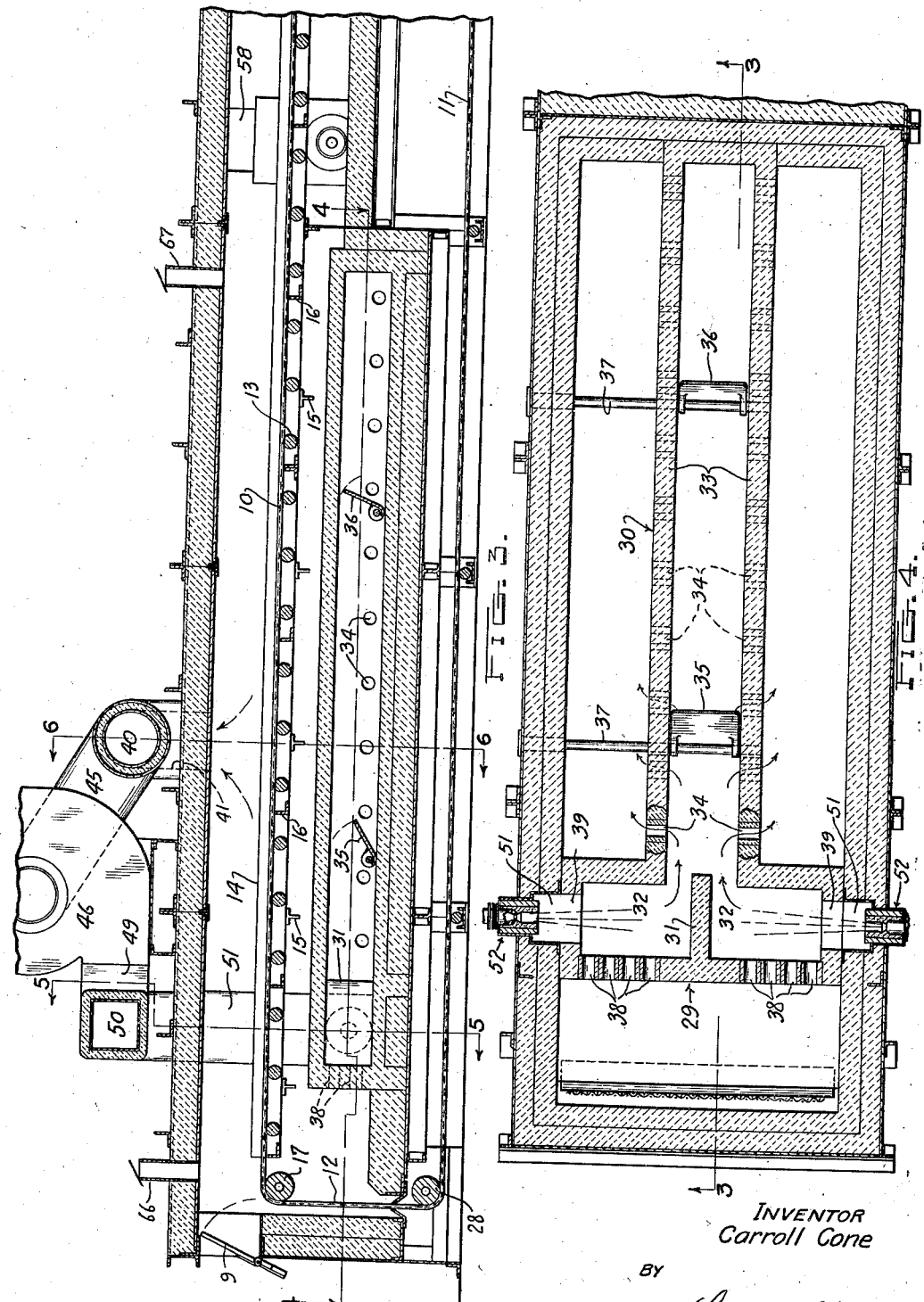
INVENTOR
Carroll Cone
BY
Charles A. Lind
ATTORNEY June 13, 1939. C. CONE 2,162,378
GLASS ANNEALING LEHR
Filed Jan. 28, 1935 4 Sheets-Sheet 3

INVENTOR
Carroll Cone
By Charles U. Lind
ATTORNEY

June 13, 1939.  C. CONE  2,162,378
GLASS ANNEALING LEHR
Filed Jan. 28, 1935  4 Sheets-Sheet 4

INVENTOR
Carroll Cone
BY
Charles A. Lind
ATTORNEY

Patented June 13, 1939

2,162,378

UNITED STATES PATENT OFFICE 2,162,378

GLASS ANNEALING LEHR

Carroll Cone, near Toledo, Ohio, assignor to Surface Combustion Corporation, Toledo, Ohio, a corporation of New York Application January 28, 1935, Serial No. 3,798

15 Claims. (Cl. 49—47)

This invention relates to improvements in continuous glass annealing lehrs of the type embodying a tunnel wherethrough the glass is passed for successive heating and cooling and has for its main object to provide for repeated heating and repeated circulation of heating gases in an improved manner in the heating zone of the tunnel. Other objects of the invention will more fully appear hereinafter.

Briefly stated, the repeated heating and circulation of the heating gases are accomplished by withdrawing heating gases from the upper portion of the heating zone and reintroducing them into the lower portion of said zone through a conduit having outlets of which some extend crosswise and others lengthwise of the tunnel, the gases being heated by admixture with highly heated gases introduced into the conduit. The particular arrangement of parts more fully appear hereinafter.

For a more complete understanding of the invention, reference is made to the detailed description taken in connection with the accompanying drawings forming part of this specification.

Referring to the drawings wherein the preferred form of the invention is shown,

Fig. 1 is a side elevation of the improved lehr with parts in section, the view being on a greatly reduced scale as compared with the other views;

Fig. 2 is a vertical, longitudinal section of a portion of the cooling zone and glass discharge end of the lehr;

Fig. 3 is a vertical, longitudinal section of the heating zone of the lehr, the view being taken on line 3—3 of Fig. 4;

Fig. 4 is a horizontal section on line 4—4 of Fig. 3;

Figure 5:
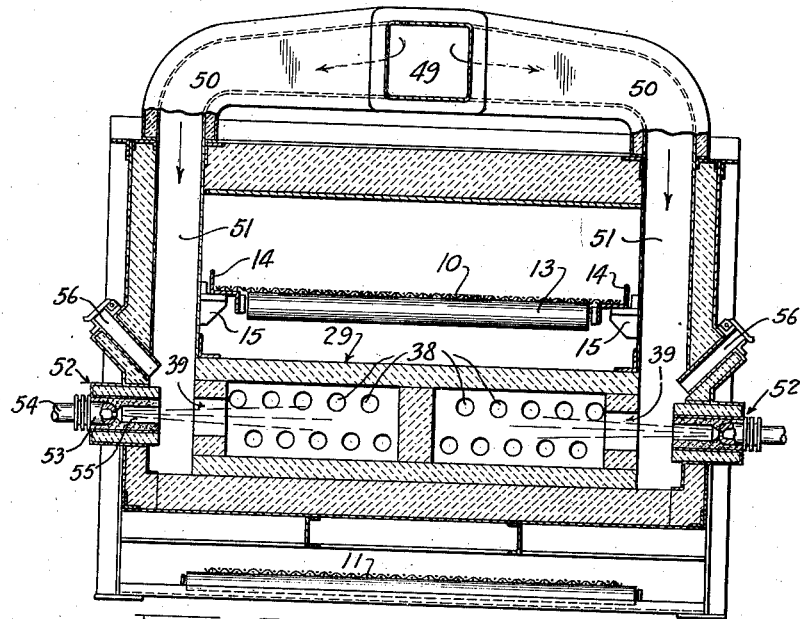
Fig. 5 is a vertical cross section of the lehr on line 5—5 of Fig. 3.
Figure 6:
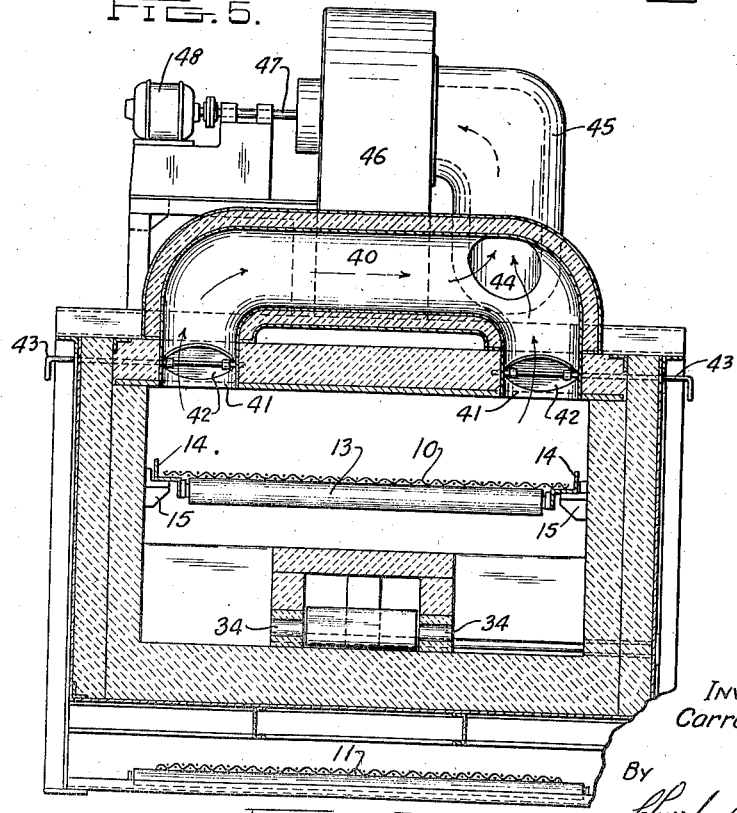
Fig. 6 is a vertical cross section of the lehr on line 6—6 of Fig. 3.
Figure 7:
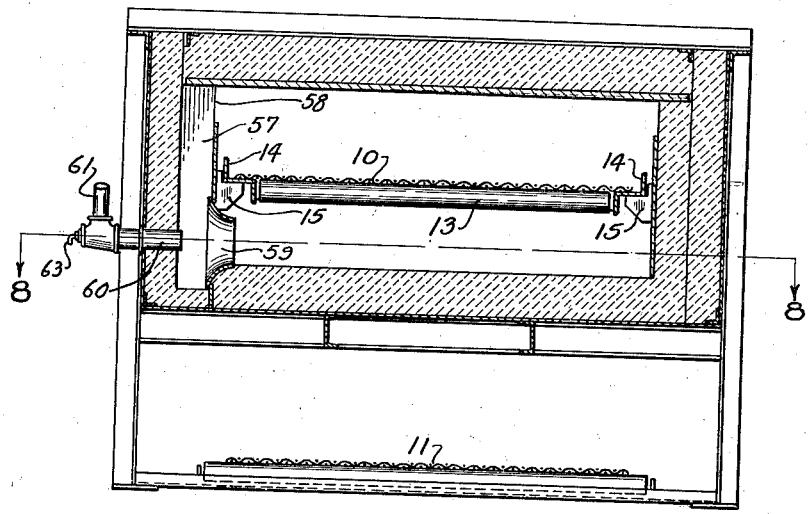
Fig. 7 is a vertical cross section of the lehr on line 7—7 of Fig. 1.
Figure 8:
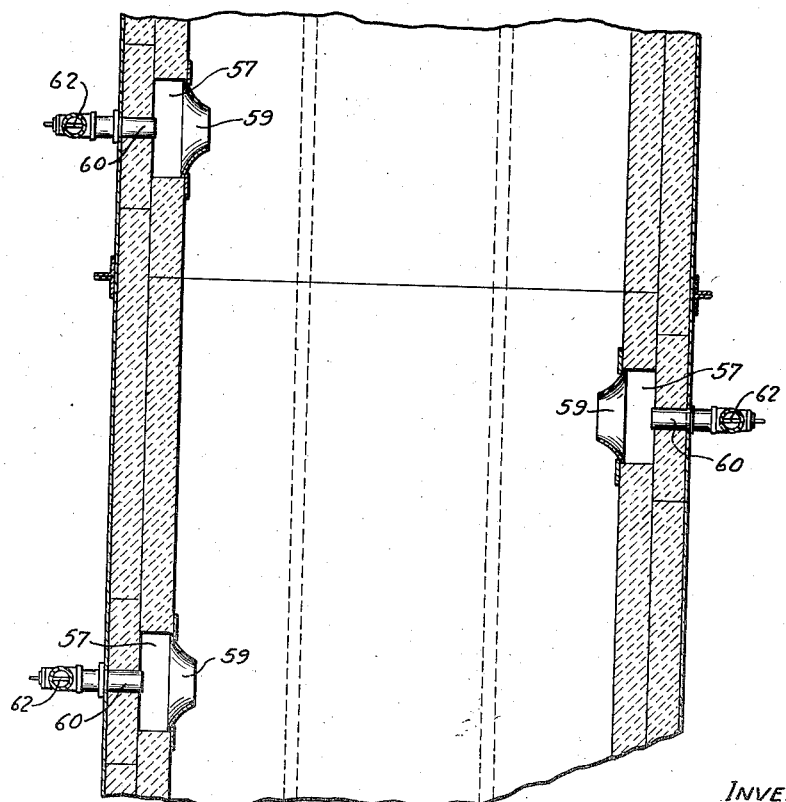
Fig. 8 is a fragmentary horizontal section on line 8—8 of Fig. 7.

The ware to be annealed is passed through a tunnel which is generally rectangular in cross section and which is of sufficient length to permit the ware to be successively heated and cooled in passing therethrough. The ware is passed through the tunnel on a suitable conveyor which preferably comprises a wire mesh belt, so arranged as to form a platform between the roof and floor of the tunnel. As viewed in Figs. 1 and 3, the left-hand end of the tunnel is the ware entering end, the ware being entered through a flap door 9.

The ware supporting strand of the conveyor belt is indicated at 10. The return portion 11 of the belt is outside of the tunnel except for a portion 12 which enters adjacent the front end wall of the tunnel. The upper strand 10 of the belt is supported on a series of rollers 13 which are supported by a frame work shown as comprising angle iron side rails 14 which are supported on ledges 15 projecting inwardly from the side walls of the tunnel, the rails being connected by cross bars 16.

At the opposite ends of the strand 10 are freely rotatable drums 17 and 18 over which the strand is looped. The belt is driven by a relatively large diameter drum 19 which is driven by suitable power mechanism M. The belt is wrapped almost entirely around the driving drum and just before it leaves the drum is pressed thereagainst by an idler 20 at the upper end of swingable links 21 pivoted as at 22 to a stationary framework. From the idler 20 the belt passes over a slidably supported idler 23 and thence to a lower idler 24. The idler 23 tends to move toward the left as viewed in Fig. 2 under the influence of weights 25 at one end of chains 26 which pass over the ends of the idler 23 and are anchored to a stationary support as at 27,— thereby taking up the slack between the two idlers 20 and 24 and tending to press the idler 20 against the driving drum. From the idler 24 the belt passes to an idler 28 adjacent to a slot in the tunnel floor through which it extends to the idler drum 17.

In the lower part of the tunnel is a horizontally arranged T-shape gas distributing chamber or conduit from which heating gases flow into the tunnel. The head 29 of the conduit extends across the tunnel inwardly of the ware entering end thereof and its leg 30 extends lengthwise thereof in spaced relation with respect to the side walls of the tunnel. In the head of the conduit centrally of the leg 30 is a wall 31 which divides the head into two opposed chambers 32, the wall projecting a short distance into the leg. The side walls 33 of the leg 30 are each provided with a series of outlet holes or ports 34. Arranged in the leg 30 between the ends thereof are two dampers 35 and 36 in spaced relation lengthwise of the leg. Each damper is mounted on a turnable shaft 37 which extends out through the side wall of the tunnel to permit the dampers to be individually adjusted. That wall of the head 29 which faces the ware entering end of the tunnel is provided with a plurality of outlet holes or ports 38. At each end of the head 29 is an inlet throat 39 through which heating gases enter the head.

Extending across the roof of the tunnel is a conduit 40 having two inlets 41 which open into the tunnel through the roof near the sides of the tunnel. In each inlet is a damper 42 which is mounted on a turnable shaft 43 to permit the dampers to be individually adjusted. The position of the inlets 41, with reference to position of the T-shape conduit, is between the ends of the leg 30 of said conduit and, generally speaking, may be said to be at the end of the high temperature portion of the heating zone in the tunnel.

The conduit 40 has an outlet 44 which is in communication with a conduit 45 which leads to the inlet side of a fan casing 46. The fan itself is not shown but its shaft is indicated at 47 and the driving motor at 48. Leading from the outlet side of the fan casing is a conduit 49 having two lateral branches 50 which extend across the roof of the tunnel and then downwardly in the side walls of the tunnel, as indicated at 51, to the respective inlets 39 of the head 29 of the T-shape conduit at the lower portion of the tunnel.

The gases which flow into the head 29 of the T-shape conduit are heated by admixture with hot gases from two burners 52 positioned in the opposite side walls of the tunnel in axial alinement with the respective throats 39 of the head 29. Each burner comprises a combustion tunnel 55 to which a preformed mixture of air and fuel gas is supplied under pressure by a supply pipe 54 which terminates in a head 53 having a restricted discharge orifice in axial alinement with said tunnel. The mixture thus discharged into the tunnel burns with great rapidity and due to the relatively restricted cross sectional area of said tunnel the latter constitutes in effect a nozzle from which the combustion products issue with considerable velocity, it being noted that the discharge end of the nozzle is spaced from the inlet throat 39 of the head 29. The burners are ignited in any preferred way as by a flare passed through a normally closed lighting passage 56 in the side walls of the lehr tunnel.

It will be readily appreciated that the gases flowing into the chambers 32 from the burners 52 and from the conduits 51 become thoroughly mixed in said chambers and thereafter flow therefrom partly through the outlet ports 38 in the front wall of said chambers and partly into the leg 30. It will be noted that the damper 35 in said leg is some distance inwardly from the inlet end of the leg and that there are outlet ports 34 in the side walls of the leg between the said damper and the said inlet. Consequently even if the damper 35 were fully closed, some of the heating gases would flow into the front end of the leg from the chambers 32. It will be readily appreciated that by varying the adjustment of the dampers 35 and 36, the distribution of heat may be correspondingly varied.

In each of the two opposite side walls of the cooling zone is a horizontally spaced series of upright ducts 57, each having its inlet 58 in the upper portion of the tunnel and its outlet 59 in the lower portion thereof, the ducts at one side being staggered with respect to the ducts at the other side. Air nozzles 60, one for each duct, are positioned in the side walls of the tunnel in axial alinement with the respective outlets 59 of the ducts. Air under pressure is supplied to the nozzles by individual supply pipes 61 in each of which is a regulating valve or damper 62 mounted on a turnable shaft or rod 63 whereby the flow of air to the nozzles may be individually controlled. It will be readily appreciated that the air from the nozzles in entering the duct outlets 59 induces a downward flow of gases in the ducts with the result that circulation of the gases in the cooling zone is effected.

Since the supply of gases in the tunnel is constantly being augmented by gases from the burners 52 and air from the nozzles 60, provision is made for venting some of the gases through the roof of the tunnel whereby to prevent objectional outflow of gases from the opposite ends of the tunnel. To this end there is provided near the ware discharge end of the tunnel a step-up 68 in the roof to provide an outlet 64 which preferably extends the full width of the roof, the flow through the outlet being controlled by an adjustable flap damper 65. There is also provided near the ware entering end of the tunnel a damper-controlled vent 66 which may or may not extend the full width of the roof. A damper controlled vent 67 is also desirably provided in the roof at a point somewhat nearer the ware entering end of the tunnel than the far end of leg 30 of the gas distributing conduit.

What I claim as new and desire to secure by Letters Patent is:

1. In combination, a tunnel having a ware-supporting platform therein, a gas-distributing chamber extending below said platform in spaced relation with respect to the side walls of the tunnel for a substantial portion of the longitudinal extent of the tunnel and having in its side walls outlet ports opening into said tunnel, means for discharging highly heated gases of combustion into one end of said chamber, and means for withdrawing gases from the upper portion of the tunnel at a point intermediate the ends of said chamber and for delivering the same to said chamber at the said one end of the latter.

2. In combination, a tunnel having a ware-supporting platform therein, a gas-distributing chamber extending below said platform in spaced relation with respect to the side walls of the tunnel for a substantial portion of the longitudinal extent of the tunnel and having outlet ports in its side walls, means including a burner for supplying highly heated gases to one end of said chamber, and means in said chamber for controlling the flow of gases longitudinally thereof.

3. In combination, a tunnel having a ware-supporting platform therein, a gas-distributing chamber extending below said platform in spaced relation with respect to the side walls of the tunnel for a substantial portion of the longitudinal extent of the tunnel and having outlet ports in its side walls, means including a duct in communication with one end of said chamber for withdrawing gases from the upper part of the tunnel and for delivering the same to said chamber, and a burner positioned to discharge into said chamber across said duct.

4. In combination, a tunnel having a ware-supporting platform therein, a gas-distributing chamber extending below said platform in spaced relation with respect to the side walls of the tunnel for a substantial portion of the longitudinal extent of the tunnel and having outlet ports in its side walls, means including a duct having its outlet in communication with one end of said chamber and having its inlet in the upper part of the tunnel at a point intermediate the ends of said portion for withdrawing gases from the tunnel and for delivering the same to said chamber, means for adding highly heated gases to the gases thus delivered to said chamber, and means in said chamber for controlling the flow of gases longitudinally thereof.

5. In combination, a tunnel having a ware-supporting platform therein, a gas distributing chamber extending below said platform crosswise of the tunnel in spaced relation with respect to the ware-entering end of the tunnel and having outlet ports facing said end, means for withdrawing gases from the tunnel at a point more remote from said end than said chamber and for delivering the same to said chamber, and means including a burner for adding highly heated gases to the gases thus delivered to said chamber.

6. In combination, a tunnel having a ware-supporting platform therein, a gas distributing chamber extending below said platform crosswise of the tunnel in spaced relation with respect to the ware-entering end of the tunnel and having outlet ports facing said end, means for withdrawing gases from the tunnel at a point more remote from said end than said chamber and for delivering the same to said chamber, means including a burner for adding highly heated gases to the gases thus delivered to said chamber, a second chamber open at one end to said chamber and extending lengthwise of the tunnel in spaced relation with respect to the sides of the latter and having outlet ports in its sides, and means in the second chamber for controlling the flow of gases lengthwise thereof.

7. In combination, a tunnel wherethrough glass may be passed for annealing and having a perforate ware supporting platform above the floor thereof, and means for heating the glass comprising: a burner in the side wall of the tunnel, a T shaped chamber below said platform and having its cross portion extending transversely of the tunnel and its body portion extending longitudinally thereof, said burner discharging hot gases into the cross portion of said chamber, and means for diffusing the hot gases from the body of said chamber into the tunnel and toward the side walls of the tunnel.

8. In combination, a tunnel wherethrough glass may be passed for annealing and having a perforate ware supporting platform above the floor thereof, and means for heating the glass comprising: a burner in the side wall of the tunnel, a chamber below said platform, said burner discharging hot gases into said chamber, said chamber having outlet ports opening into the tunnel for diffusing a portion of said hot gases toward the side walls of the tunnel and a portion toward the entrance wall of the tunnel.

9. A glass annealing lehr comprising, in combination, a lehr tunnel having a ware-supporting platform therein, a duct having its ends open to the upper portion of the tunnel at laterally spaced points therein and having an outlet intermediate said ends, a damper in said duct at either side of said outlet, means coupled to said outlet for withdrawing tunnel gases through said duct, a chambered structure below said platform and having a plurality of outlets opening into the tunnel, a duct for delivering the withdrawn tunnel gases to said structure, and means for discharging hot gases of combustion into said structure for flow into the tunnel along with gases previously withdrawn from the tunnel.

10. In combination, a tunnel having a ware-supporting platform therein, a gas distributing chamber extending below said platform crosswise of the tunnel in spaced relation with respect to the ware-entering end of the tunnel and having outlet ports facing said end, means for withdrawing gases from the tunnel at a point more remote from said end than said chamber and for delivering the same to said chamber, means including a burner for adding highly heated gases to the gases thus delivered to said chamber, and another chamber forming a longitudinal extension of the first chamber and having a plurality of outlets opening into the tunnel.

11. A glass annealing lehr comprising, in combination, a lehr tunnel, a chambered structure in the lower part of the tunnel and extending lengthwise thereof for a substantial portion of the longitudinal extent of the tunnel and having a plurality of outlets opening into the tunnel and having its front end spaced from the ware entering end of the tunnel, a burner at either side of the tunnel discharging hot gases of combustion into the front end of said structure, means for withdrawing gases from the upper portion of the tunnel and for discharging the same into the front end of said structure for admixture with the said gases of combustion, and means above said structure for conveying articles of glassware through the tunnel.

12. A lehr for annealing glassware, comprising a tunnel, an openwork ware conveyor extending through said tunnel for transporting glassware to be annealed, means for producing gases of combustion and for delivering said gases into the tunnel below the conveyor, including means for directing some of said gases forwardly toward the ware-entering end of the tunnel, means for directing other of said gases laterally of said tunnel, and means for effecting recirculation of at least a part of said gases so introduced into the tunnel.

13. A glassware annealing lehr, comprising a tunnel, an openwork conveyor for transporting glassware therethrough, and means located below the conveyor and adjacent to the longitudinal vertical central plane of the tunnel for delivering hot gases into the tunnel below the conveyor and for directing them laterally toward the side walls of the tunnel.

14. A glassware annealing lehr, comprising a tunnel, an openwork conveyor for transporting glassware therethrough, means located below the conveyor and adjacent to the longitudinal vertical central plane of the tunnel for delivering hot gases into the tunnel below the conveyor and directing them laterally toward the side walls, and means for recirculating at least some of said gases.

15. A glassware annealing lehr, comprising a tunnel, an openwork conveyor extending therethrough for the transportation of glassware through the tunnel, heating means located beneath the conveyor and arranged longitudinally of the tunnel adjacent to its center line for delivering products of combustion into the tunnel below the conveyor and toward the side walls of said tunnel, means for regulating the volume of such gases delivered at intervals longitudinal of the tunnel, and means for recirculating a portion of said gases.

CARROLL CONE.